United States Patent [19]

Betancourt

[11] Patent Number: 5,376,264
[45] Date of Patent: Dec. 27, 1994

[54] DRAIN TRAP

[76] Inventor: Sergio Betancourt, 923 Heberton St., Pittsburgh, Pa. 15203

[21] Appl. No.: 16,803
[22] Filed: Feb. 11, 1993
[51] Int. Cl.⁵ .............................................. B01D 35/02
[52] U.S. Cl. ......................................... 210/166; 4/292; 210/483
[58] Field of Search ................ 4/286, 292; 210/166, 210/483

[56] References Cited

U.S. PATENT DOCUMENTS

| Re. 31,561 | 4/1984 | Thompson | 4/290 |
|---|---|---|---|
| 814,481 | 3/1906 | Savard . | |
| 1,203,530 | 10/1916 | Gessler . | |
| 2,690,569 | 10/1954 | Kozerski | 4/292 |
| 2,695,411 | 11/1954 | Vinokor | 4/292 |
| 3,742,524 | 7/1973 | Ballentine | 4/286 |
| 3,982,289 | 9/1976 | Robbins | 4/292 |
| 4,146,939 | 4/1979 | Izzi | 4/286 |
| 4,199,827 | 4/1980 | Tuleja | 4/289 |
| 4,207,631 | 6/1980 | Baggey | 4/286 |
| 4,301,557 | 11/1981 | Walraven | 4/286 |
| 4,471,497 | 9/1984 | Riutort et al. | 4/286 |
| 4,671,976 | 6/1987 | Vidal | 4/292 |
| 4,825,477 | 5/1989 | Aranda | 4/292 |
| 4,910,811 | 3/1990 | Izzi | 4/292 |

*Primary Examiner*—Ivars Cintins
*Attorney, Agent, or Firm*—Kirkpatrick & Lockhart

[57] ABSTRACT

A drain trap apparatus is provided for preventing the passage of debris into a drain opening which includes a disposable filter and which allows complete drainage of the wastewater. The drain trap has an annular support member which is semi-permanently attached around the drain opening. A passageway extends radially through the support member so that water will be allowed to pass through the support member. A filter, preferably of a flexible plastic mesh material, is removably attached to the support member by a plurality of hook members, such as the hook portion of a hook and loop fastener.

8 Claims, 4 Drawing Sheets

DRAIN TRAP

BACKGROUND OF THE INVENTION

1. Field of the Invention

The present invention is directed to an apparatus for preventing the passage of debris into a drain opening and, more particularly, to a drain trap which includes a disposable filter and which allows complete drainage of the wastewater.

2. Description of the Invention Background

Many drain traps exist in the prior art which operate to prevent debris from entering the mouth of an open drain and clogging the drain. Such open drains are found in a variety of environments such as shower or sink drains in a home; however, it will be appreciated that the instant invention will be applicable to many other open drains. Drain traps in the prior art typically comprise a strainer or grid which is received into the drain opening or is secured over the drain opening by clips that extend into the drain opening. Those drain traps frequently require cleaning. Some drain traps circumvent the necessity for cleaning by providing for a disposable assembly. For example, U.S. Pat. No. 3,982,289, issued Sep. 28, 1976 to Robbins, discloses a disposable sink strainer that is made of disposable plastic. U.S. Pat. No. 3,742,524, issued Jul. 3, 1973 to Ballentine, discloses a drain strainer comprising an aluminum mesh which is folded about a peripheral ring and placed into or over the drain. U.S. Pat. No. 4,471,497, issued Sep. 18, 1984 to Riutort et al. discloses a lavatory filter comprising an annular ring with a disposable dome shaped strainer member made of metal mesh material and held down by curved leaf springs which engage the inner surface of the drain opening. All of the above-described strainers disclose disposable strainer elements that must be pre-formed before they can be installed. This added manufacturing step contributes to a greater overall cost for the disposable element, thus making the strainers less economically attractive when compared to conventional non-disposable strainers. Furthermore, in the Ballentine and Riutort devices, the ring member which holds the disposable element does not allow the water having a level less than the height of the ring member to pass therethrough, and therefore the water cannot drain completely around the ring member. As such, when using those prior strainer devices, one is often left with an amount of debris carrying water in the bottom of the sink or vessel. To remove that water, it becomes necessary to remove the strainer, thus creating the opportunity for excessive amounts of strained debris remaining in the water to pass into the drain and become lodged therein.

Thus, the need exists for a disposable drain trap which is economical to produce, in which the filter is easy to change, and which allows the water to fully drain.

SUMMARY OF THE INVENTION

The present invention is directed to a disposable drain trap for preventing the passage of debris into a drain opening. The present invention includes a support member which essentially surrounds the opening of the drain, and which has substantially the same perimetrical shape as the drain opening. In one embodiment, the support member consists of a flat flexible ring that is semi-permanently attached around the drain opening with glue or adhesive tape. A slot extending from the inner edge to the outer edge of the support member allows for complete drainage of the water. In an alternate embodiment, a plurality of interspaced suction members are used to semi-permanently attach the support member around the drain opening. The space between the suction members permits all of the water to pass through the support member and into the drain.

A filter preferably consisting of a flexible plastic mesh material is removably attached to the support member by attachment means. The attachment means may include a plurality of hook members, such as the hook portion of a hook and loop fastener, which are attached to the upper surface of the support member. The filter material is manually pressed onto the hook members to secure the filter to the support member. This arrangement allows the mesh filter to be removably attached to the support member such that the filter holds fast when in use, but which can be easily removed by pulling it off with the hand for disposal of the filter and any entrained debris.

Accordingly, the present invention provides solutions to the aforementioned problems encountered when draining debris laden water or liquid into open drains. This invention provides a drain trap having disposable filtering means that may be fastened to an open drain for straining the debris from debris carrying liquid while permitting all of the liquid to pass therethrough. These and other details, objects and advantages of the invention will become apparent as the detailed description of the present invention proceeds.

BRIEF DESCRIPTION OF THE DRAWINGS

In order that the present invention may be easily understood and readily practiced, a preferred embodiment will now be described, by way of example only, in conjunction with the following Figures wherein.

DETAILED DESCRIPTION OF THE PREFERRED EMBODIMENTS

Figure 1:
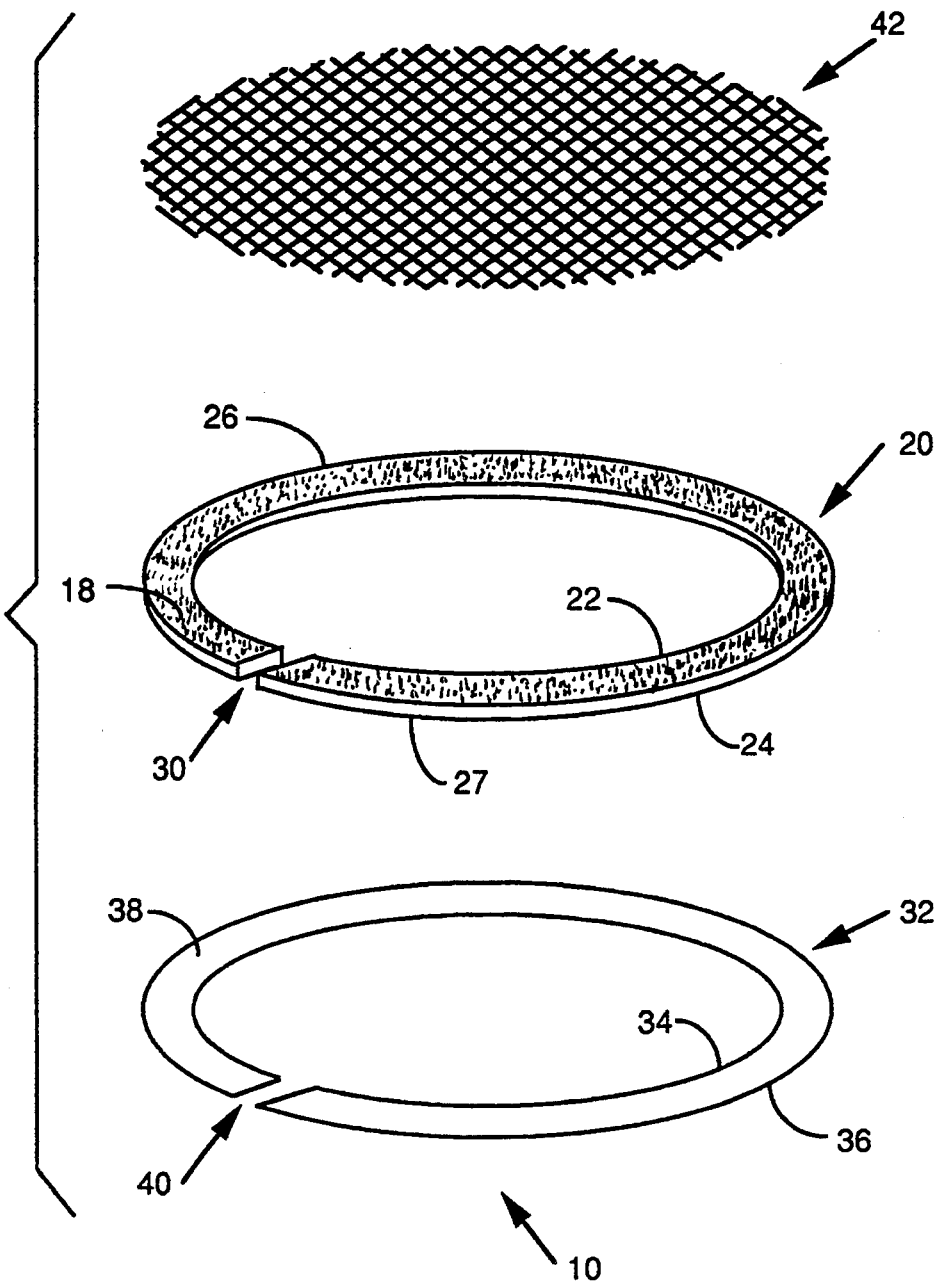
FIG. 1 is an exploded assembly view of one embodiment of the drain trap according to the present invention.
Figure 2:
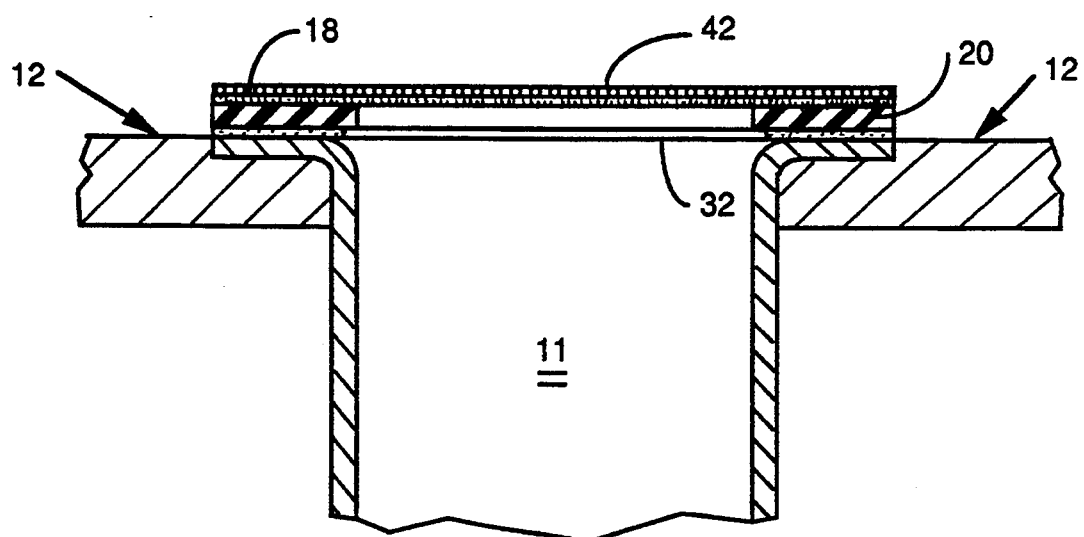
FIG. 2 is a cross-sectional view of the drain trap of the present invention in place around a drain opening.

Referring now to the drawings for purposes of illustrating the preferred embodiments of the present invention only, and not for purposes of limiting the same, the Figures show a drain trap assembly generally designated as 10 for preventing the passage of debris into an open drain. More particularly, and with reference to FIGS. 1 and 2, the drain trap assembly 10 includes a support member 20, a filter 42 and means such as adhesive tape 32 for attaching the support member 20 to a surface 12 around a drain opening or member 11 (See FIG. 2).

In the preferred embodiment, the support member 20 is a piece of flexible plastic material, annular in shape, having an inner edge 22, an outer edge 24, an upper surface 26 and a lower surface 27. Those of ordinary skill in the art, however, will recognize that the support member 20 may be made of aluminum, stainless steel, hard plastic, rubber, or the like. The flexible support member 20 allows for complete contact with the surface 12 surrounding the drain opening 11. Preferably, the inner edge 22 of the support member 20 has the same or slightly larger shape and circumference as the perimeter of the drain opening 11, although the support member 20 can have a shape and circumference that is much larger than the drain opening and still function properly. Typical drain openings include circular openings of about one to three inches in diameter such as may be found in a bathroom sink; larger openings of about three to eight inches might be found in private showers and/or utility sinks; public showers might have openings of diameter greater than eight inches. Obviously, the size and shape of industrial and commercial open drains may vary widely, but may, nonetheless, be served by the present invention. Drain openings typically are circular, but often have a perimeter of polygonal shape, such as a square, or some other shape. The shape of support member 20 should generally correspond to the perimetrical shape of the opening 11.

The outer edge 24 of support member 20 has a radius larger than inner edge 22. In the application of a shower drain having a diameter of three inches, the outer edge 24 might have a radius of about two and one-half inches and the inner edge 22 might have a radius of about one and three-quarters inches. However, the outer edge 24 can be of any size greater than the inner edge 22 as long as the top surface 26 is of sufficient area to firmly hold the filter 42, as further described below. The width of the support member 20 comprising the difference between the inner radius and outer radius can be from about one-quarter of one inch for a small diameter drain opening up to two or three inches for a much larger drain opening.

A slot 30, extending from the inner edge 22 of support member 20 to the outer edge 24 of support member 20, allows water to pass through support member 20. The slot 30 allows water in the bottom of the shower, tub or other receptacle to drain completely, without leaving a thin layer of water the depth of the thickness of the support member 20. The width of the slot 30 should not be so great as to allow significant amounts of debris to pass therethrough. For example, I have found that a slot having a width that is equivalent to twice the thickness of the support member works well for many household applications. However, those of ordinary skill in the art will appreciate that the slot width may vary with the type and size of debris being encountered.

The support member 20 may be semi-permanently attached to the surface 12 surrounding the drain opening 11 by a variety of fastening means. More specifically, in one embodiment of the present invention adhesive tape 32 is used to secure the support member 20 to the surface 12 surrounding the drain opening 11. The adhesive tape 32 is of generally the same shape as support member 20, having an inner edge 34, an outer edge 36, a top surface 38, a bottom surface (not shown) and a corresponding slot 40 extending radially from inner edge 34 to outer edge 36. The adhesive tape 32 has adhesive on both top surface 38 and the bottom surface and is pressed between the support member 20 and the surface 12. It will be appreciated that the adhesive tape 32 serves to semi-permanently attach the support member 20 to the surface 12 so that the support member 20 will not move by the force of water or by being stepped upon, but will allow for removal of the support member 20 without damaging the surface 12.

Alternately, a weak glue (not shown) can be used in place of the double sided adhesive tape 32 to semi-permanently attach the support member 20 to the surface 12. It will be understood that the glue is strong enough to prevent the support member 20 from being dislodged by the force of water or by being stepped upon, while allowing the support member 20 to be removed after long-term usage. Such glues are known in the art.

The water is filtered or strained before entering the drain opening 11 by a disposable filter material 42 that is removably attached to the support member 20. Filter 42 is preferably made of a thin flexible plastic mesh material, the mesh having holes approximately $\frac{1}{8}$" in diameter. It will be appreciated, however, that the holes can be of any size sufficient to prevent the passage of the particular debris desired to be filtered. For example, the filter material 42 can be of the type typically available in large sheets or rolls at hardware stores. However, other materials can also be used as long as the filter 42 functions in conjunction with the means for fastening the filter 42 to the support member 20, as described immediately below.

The filter 42 is removably attached to support member 20 by means of a plurality of densely packed hooks 18 fixed to upper surface 26 of support member 20. The hooks 18 are similar to the hook portion of hook and loop fasteners known in the art. I have found that the hook portion of the hook and loop fastening material manufactured by VELCRO Industries under the trademark VELCRO ® to be well suited for fastening the filter material 42 to the support member 20. In particular, the hooks 18 are typically densely packed onto strips or sheets, and these sheets are preferably glued to the top surface 26 of support member 20. The fine strands of the mesh filter 42 operate similarly to the loop portion of the hook and loop fasteners. The numerous hooks pass around the fine strands of the filter material 42 at many different points, thus attaching the filter 42 thereto. This arrangement prevents the water pressure from dislodging the filter 42, while allowing a person to easily remove the filter 42 by simply pulling it off with one hand. In this manner, the filter 42 can easily be replaced.

Figure 3:
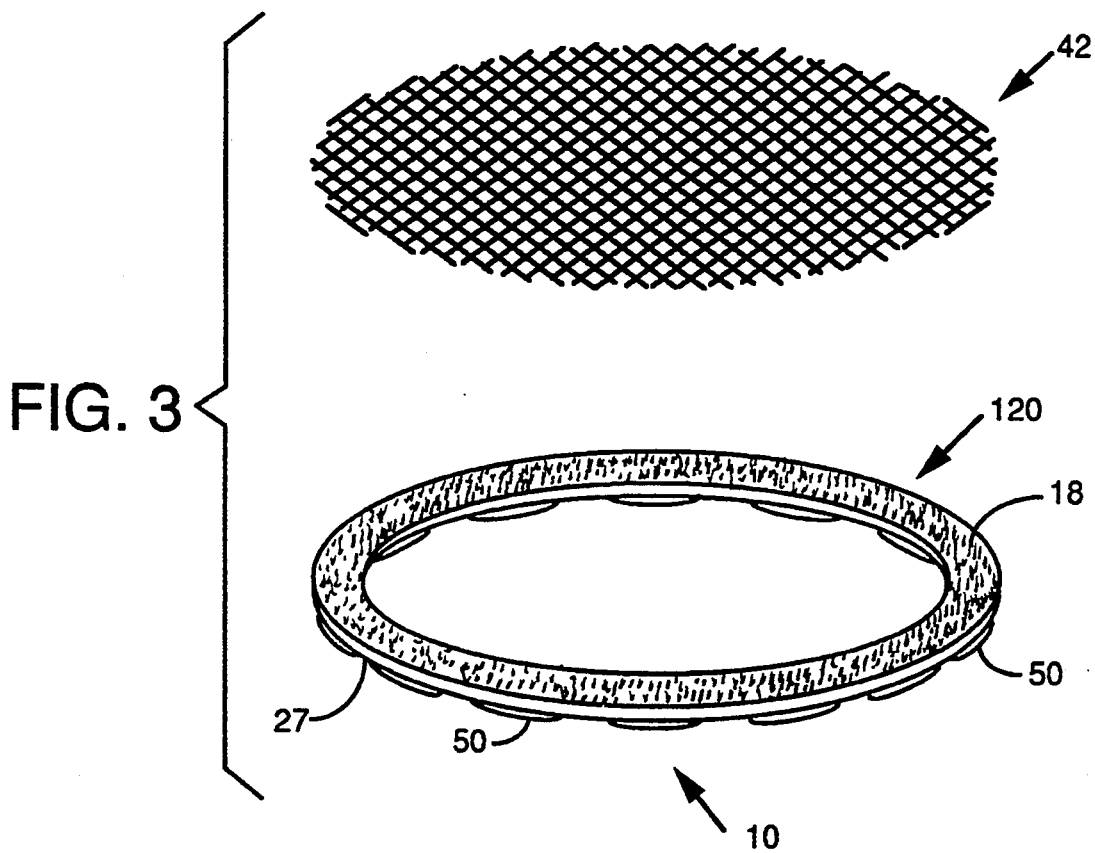
FIG. 3 is an exploded assembly view of another embodiment of the invention.
Figure 4:
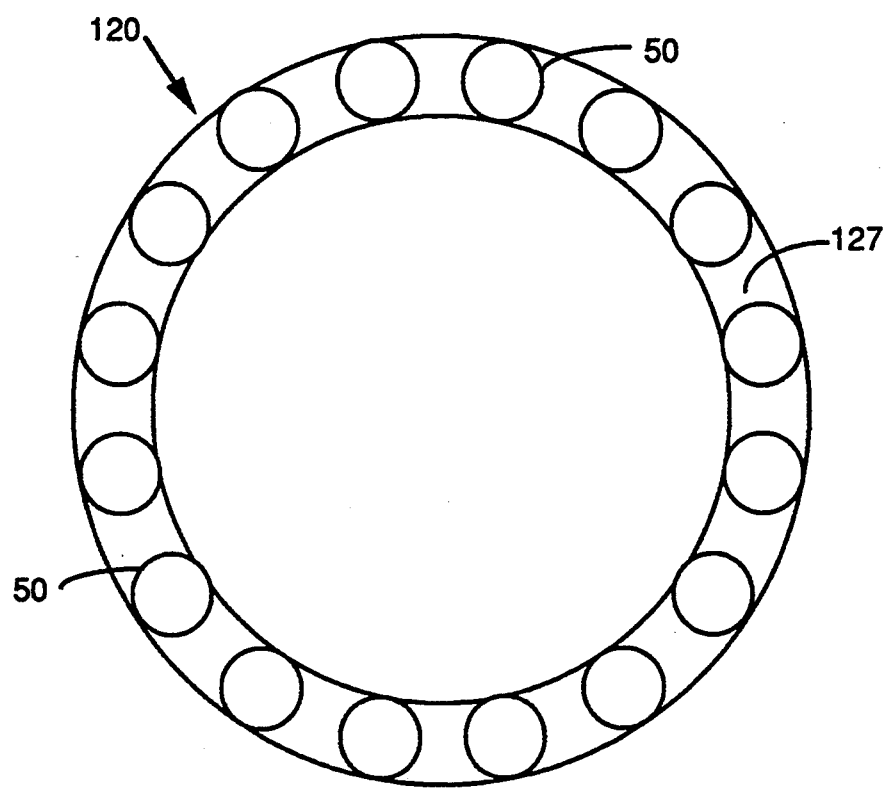
FIG. 4 is a bottom view of the support member of the embodiment of FIG. 3.

In an alternative embodiment, as shown in FIGS. 3 and 4, support member 120 is semi-permanently attached to the surface 12 by means of a plurality of suction members 50. Suction members 50 consist of small conventional suction cups that are interspaced along the lower surface 127 of support member 120. Suction members 50 are preferably constructed of flexible plastic cup members which can be pressed against a surface and which are held in place via a vacuum that is created underneath the cup. The suction members 50 are preferably attached to the support member 120 by conventional glue, however, other mechanical fastening methods may be used. In this embodiment, the support member 120 is pressed against the surface 12 around the drain opening 11, to attach the suction members 50 thereto. The suction members 50 hold the support member 120 semi-permanently to the surface 12 around the drain opening 11, such that support member 120 will not be dislodged by the force of water or by being stepped upon. In this embodiment, the spaces between the suction members 50 serve as small openings to allow the water to drain under the support member 120, without allowing any debris to pass through. This embodiment also prevents a thin layer of water from building up around the support member 120. Therefore, no slot is required in the support member 120 as was disclosed in the previously described embodiments. Also in this embodiment, the filter 42 is removably fastened to the hooks 18 that are attached to the upper surface 126 of the support member 120 as was previously described hereinabove.

Figure 5:
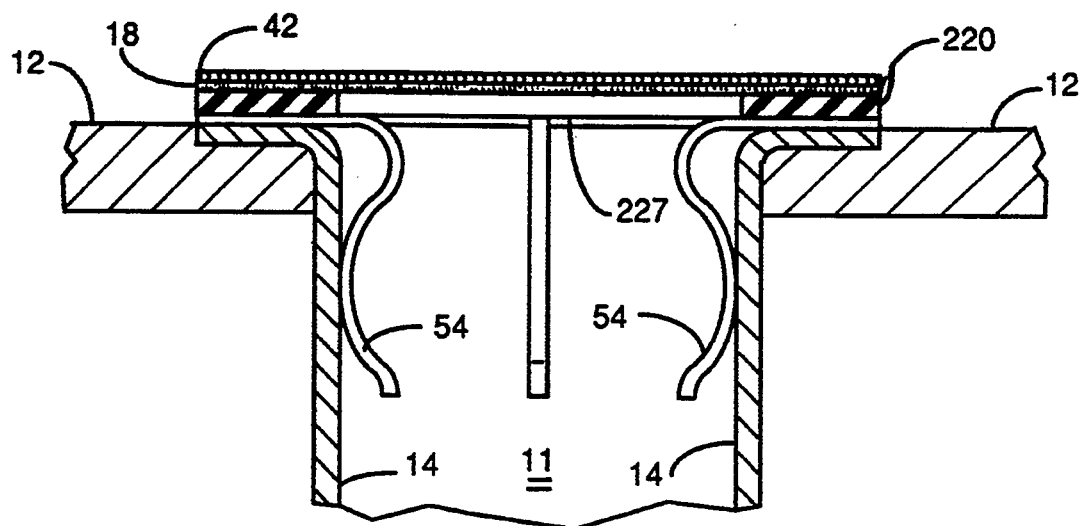
FIG. 5 is a cross-sectional view of another preferred embodiment of the drain trap of the present invention in place around a drain opening.

In another alternate embodiment as shown in FIG. 5, the support member 220 is semi-permanently attached around the drain opening 11 by means of a plurality of clips 54. The clips 54 are spaced along the bottom surface 227 of support member 220 and are preferably constructed of flexible metallic material which has the ability to spring back to its original shape. In the preferred embodiment, the clips 54 are glued via conventional glue to the support member 220. However, clips 54 may also be fastened to the support member 220 by a myriad of other fastening means that are compatible with the materials comprising the support member 220 and the clips 54. For example, if the support member 220 is metal, the clips 54 may be welded or brazed onto the support member 220.

As is most clearly shown in FIG. 5, clips 54 extend inwardly from the support member 220 and curve downward to extend into the drain opening 11. The clips 54 press outwardly against side walls 14 of drain opening 11. The pressure against the walls 14 from opposing clips 54 act to semi-permanently attach the support member 220 to the drain opening 11. In this embodiment, the spaces between the clips 54 serve as narrow passageways for allowing the water to drain under the support member 220, without allowing any debris to pass through thus preventing a thin layer of water from building up around the support member 220. Therefore, no slot is required in the support member 220 as was necessary in the previously-described embodiments. As was discussed above, the filter 42 is fastened to the hooks 18 that are attached to the upper surface 226 of the support member 220.

Figure 6:
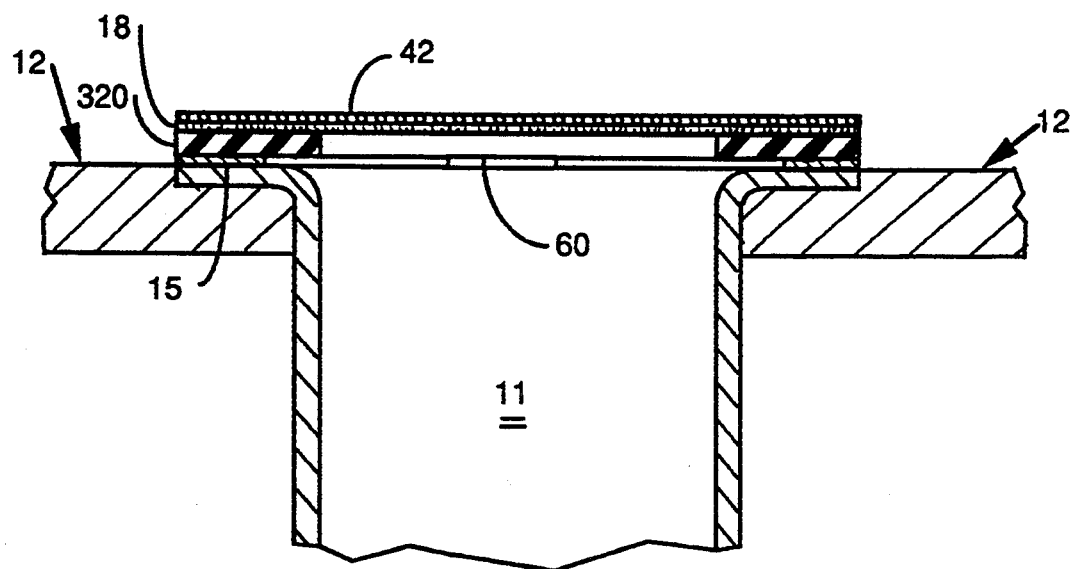
FIG. 6 is a cross-sectional view of an alternate embodiment of the present invention.

In yet another embodiment, a plurality of magnets 60 are attached to the support member 320 (See FIG. 6). Preferably, the magnets 60 are glued to the support member 320, however, other fastening means such as screws may be employed. It will be understood that the magnets 60 are attached to the collar portion 15 of the drain member 11 and serve to removably attach the support member 320 to the drain member 11. It will be further understood that because the magnets 60 hold the support member 320 a small distance above the drain member 11, there is no need for a slot or water passage in the support member 320. The filter 42 is removably fastened to the upper surface 326 of the support member 320 by hooks 18 as was previously described hereinabove.

While the present invention has been described in conjunction with a number of preferred embodiments, many modifications and variations will be readily apparent to those of ordinary skill in the art. This disclosure and the following claims are intended to cover all such modifications and variations.

What is claimed is:

1. A drain trap for preventing the passage of debris into a drain opening, comprising:
    a support member having an upper surface and a lower surface and having an inner edge which is at least as large as said drain opening, and an outer edge, said support member having a slot radially extending from said inner edge of said support member to said outer edge of said support member for allowing fluid to pass through said support member;
    a filter;
    means for removably attaching said filter to said upper surface of said support member; and
    means for semi-permanently attaching said support member around said drain opening.

2. A drain trap as recited in claim 1, wherein said filter comprises a mesh material and wherein said means for removably attaching said filter to said support member comprises a plurality of hook members, said hook members being attached to said upper surface of said support member.

3. A drain trap as recited in claim 1, wherein said means for semi-permanently attaching said support member around said drain opening comprises adhesive tape.

4. A drain trap as recited in claim 1, wherein said means for semi-permanently attaching said support member around said drain opening comprises a weak glue.

5. A drain trap as recited in claim 1, wherein said support member is substantially the same shape as the perimeter of said drain opening.

6. A drain trap as recited in claim 1 wherein said support member is flexible.

7. A drain trap as recited in claim 1 wherein said support member is formed from a material selected from the group consisting of rubber, plastic and metal.

8. A drain trap for preventing the passage of debris into a drain opening, comprising:
    a substantially flat, flexible, annular support member, said support member having a radial slot extending from the interior edge of said support member to the exterior edge of said support member;
    a filter comprising a flat flexible plastic mesh of a circumference substantially equal to the circumference of said exterior edge of said support member;
    a plurality of molded plastic hook members secured to the upper surface of said support member for removably attaching said filter to the top surface of said support member; and
    means for semi-permanently attaching said support member around said drain opening.

* * * * *